US011028947B2

(12) United States Patent
Srinivasan et al.

(10) Patent No.: US 11,028,947 B2
(45) Date of Patent: Jun. 8, 2021

(54) COUPLING FOR ELECTRIC VEHICLE BATTERY PACK

(71) Applicant: Ford Global Technologies, LLC, Dearborn, MI (US)

(72) Inventors: Giriraj Srinivasan, Troy, MI (US); Neil Robert Burrows, White Lake Township, MI (US); James McManaman, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1739 days.

(21) Appl. No.: 14/087,268

(22) Filed: Nov. 22, 2013

(65) Prior Publication Data

US 2015/0144314 A1 May 28, 2015

(51) Int. Cl.
| | |
|---|---|
| *F28F 9/02* | (2006.01) |
| *F16L 39/00* | (2006.01) |
| *H01M 10/6556* | (2014.01) |
| *H01M 10/613* | (2014.01) |
| *H01M 10/625* | (2014.01) |
| *F16L 13/08* | (2006.01) |
| *F16L 23/026* | (2006.01) |
| *H01M 10/6567* | (2014.01) |

(52) U.S. Cl.
CPC ............ *F16L 13/08* (2013.01); *F16L 23/026* (2013.01); *F16L 39/00* (2013.01); *F28F 9/0253* (2013.01); *H01M 10/613* (2015.04); *H01M 10/625* (2015.04); *H01M 10/6556* (2015.04); *H01M 10/6567* (2015.04)

(58) Field of Classification Search
CPC .................... F16L 13/08; F28F 3/12

USPC ............... 165/80.5, 178; 285/124.5
See application file for complete search history.

(56) References Cited

U.S. PATENT DOCUMENTS

| | | | | |
|---|---|---|---|---|
| 5,477,919 A | * | 12/1995 | Karube | ............... F28D 1/05391 165/176 |
| 5,630,326 A | * | 5/1997 | Nishishita | ............... F16L 39/00 165/153 |
| 5,632,161 A | * | 5/1997 | Shimoya | ............... F25B 39/022 62/113 |
| 6,443,223 B2 | * | 9/2002 | Ichiyanagi | .................... 165/153 |
| 6,796,370 B1 | * | 9/2004 | Doll | ........................ F28F 3/048 165/168 |
| 7,717,470 B1 | | 5/2010 | Pluymers | |
| 8,305,760 B2 | | 11/2012 | Howes et al. | |
| 2007/0076374 A1 | * | 4/2007 | Mongia | ............... H01L 23/4006 361/699 |

(Continued)

FOREIGN PATENT DOCUMENTS

| | | | | |
|---|---|---|---|---|
| CN | 101852280 | | 6/2010 | |
| DE | WO 2012019719 A1 | * | 2/2012 | ........ H01M 10/5016 |
| JP | 2005291441 A | * | 10/2005 | ......... B60H 1/00328 |

OTHER PUBLICATIONS

Translation of JP 2005291441 A entitled Translation-JP 2005291441 A.*

*Primary Examiner* — Paul Alvare
(74) *Attorney, Agent, or Firm* — David Kelley, Esq.; Carlson, Gaskey & Olds, P.C.

(57) ABSTRACT

An example coupling for an electric vehicle battery pack includes an attachment member configured to connect to a cold plate, a fluid inlet extending from the attachment member, and a fluid outlet extending from the attachment member.

4 Claims, 6 Drawing Sheets

(56) References Cited

U.S. PATENT DOCUMENTS

| | | | |
|---|---|---|---|
| 2009/0140515 A1* | 6/2009 | Ichimura | F16L 39/00 |
| | | | 285/124.5 |
| 2010/0300646 A1 | 12/2010 | Sawaguchi et al. | |
| 2012/0315528 A1 | 12/2012 | Rajaie et al. | |
| 2013/0189558 A1 | 7/2013 | Haussmann | |
| 2013/0192807 A1 | 8/2013 | DeKeuster | |
| 2013/0196207 A1* | 8/2013 | Zahn | H01M 10/5016 |
| | | | 429/120 |

* cited by examiner

COUPLING FOR ELECTRIC VEHICLE BATTERY PACK

BACKGROUND

This disclosure relates to a coupling in a vehicle and, more particularly, to a coupling to connect a fluid supply and a cold plate of an electric vehicle battery pack.

Generally, electric vehicles differ from conventional motor vehicles because electric vehicles are selectively driven using one or more battery-powered electric machines. Conventional motor vehicles, by contrast, rely exclusively on an internal combustion engine to drive the vehicle. Electric vehicles may use electric machines instead of, or in addition to, the internal combustion engine.

Example electric vehicles include hybrid electric vehicles (HEVs), plug-in hybrid electric vehicles (PHEVs), and battery electric vehicles (BEVs). A powertrain of an electric vehicle is typically equipped with a battery that stores electrical power for powering the electric machine. The battery may be charged prior to use. The battery may be recharged during a drive by regeneration braking or an internal combustion engine.

The battery is part of a battery pack. The battery pack may include other components, such as inverters. Components of the battery pack generate heat during operation. The heat can be removed from the battery pack using a cold plate. During operation, fluid circulated within the cold plate absorbs heat. The heated fluid is then communicated away from the cold plate. In some examples, the cold plate may communicate fluid to the battery pack to heat the battery pack, such as in relatively cold environments.

Tight packaging near the cold plate can make assembling fluid connectors in the area of the cold plate complicated and difficult to execute. Current fluid connectors require several assembly steps to secure the fluid connectors to the cold plate. Current fluid connectors require significant packaging space.

SUMMARY

A coupling for an electric vehicle battery pack according to an exemplary aspect of the present disclosure includes, among other things, an attachment member configured to connect to a cold plate, a fluid inlet extending from the attachment member, and a fluid outlet extending from the attachment member.

In a further non-limiting embodiment of the foregoing coupling, the fluid inlet and the attachment member both establish portions of a fluid inlet path to the cold plate. The fluid outlet and the attachment member both establish portions of a fluid outlet path from the cold plate. The fluid inlet path is separate and distinct from the fluid outlet path.

In a further non-limiting embodiment of any of the foregoing couplings, the fluid inlet and the fluid outlet interface with a common surface of the attachment member.

In a further non-limiting embodiment of any of the foregoing couplings, the fluid inlet and the fluid outlet are brazed to the common surface.

In a further non-limiting embodiment of any of the foregoing couplings, the attachment member interfaces with the cold plate at an interfacing surface that is transverse to the common surface.

In a further non-limiting embodiment of any of the foregoing couplings, the interfacing surface defines an inlet opening to receive an inlet extension from the cold plate. The attachment member further defines an outlet opening to receive an outlet extension from the cold plate.

In a further non-limiting embodiment of any of the foregoing couplings, the coupling includes a fastener surface facing away from the interfacing surface. The fastener surface defines an opening to receive a fastener that secures the attachment member to the cold plate.

In a further non-limiting embodiment of any of the foregoing couplings, the attachment member comprises an interfacing surface, and a plurality of walls extend away from the interfacing surface. The interfacing surface interfaces with the cold plate. The fluid inlet extends from at least one of the plurality of walls. The fluid outlet extends from at least one of the plurality of walls.

In a further non-limiting embodiment of any of the foregoing couplings, the plurality of walls extend from the interfacing surface to a fastener surface. The fastener surface defines an opening to receive a fastener that secures the attachment member to the cold plate.

An assembly for an electric vehicle battery pack according to an exemplary aspect of the present disclosure includes, among other things, a cold plate extension providing both a portion of a fluid inlet conduit to a cold plate and a portion of a fluid outlet conduit to the cold plate, and a coupling including an attachment member, a fluid inlet, and a fluid outlet. The cold plate extension and the coupling are selectively attached to each other to communicate fluid to and from the cold plate.

In a further non-limiting embodiment of the foregoing assembly, the assembly includes a fluid inlet extension of the cold plate extension and a fluid outlet extension of the cold plate extension. The fluid inlet extension and the fluid outlet extension are received within respective apertures in the coupling when the cold plate extension is attached to the coupling.

In a further non-limiting embodiment of any of the foregoing assemblies, the assembly includes an inlet seal about the fluid inlet extension and an outlet seal about the fluid outlet extension.

In a further non-limiting embodiment of any of the foregoing assemblies, the fluid inlet conduit and the fluid outlet conduit turn within the cold plate extension.

In a further non-limiting embodiment of any of the foregoing assemblies, the coupling is configured to be secured to the cold plate extension with a mechanical fastener.

A method of communicating fluid to and from a cold plate of an electric vehicle according to an exemplary aspect of the present disclosure includes, among other things, communicating fluid from a coupling to a cold plate extension, communicating fluid from the cold plate extension to the coupling, and redirecting the fluid within an attachment member of the coupling.

In a further non-limiting embodiment of the foregoing method, the method includes fastening the coupling to the cold plate extension with a mechanical fastener.

In a further non-limiting embodiment of any of the foregoing methods, the fluid is communicated to the attachment member in a first direction and communicated from the attachment member in a second direction that is transverse to the first direction.

In a further non-limiting embodiment of any of the foregoing methods, the first direction is perpendicular to the second direction.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
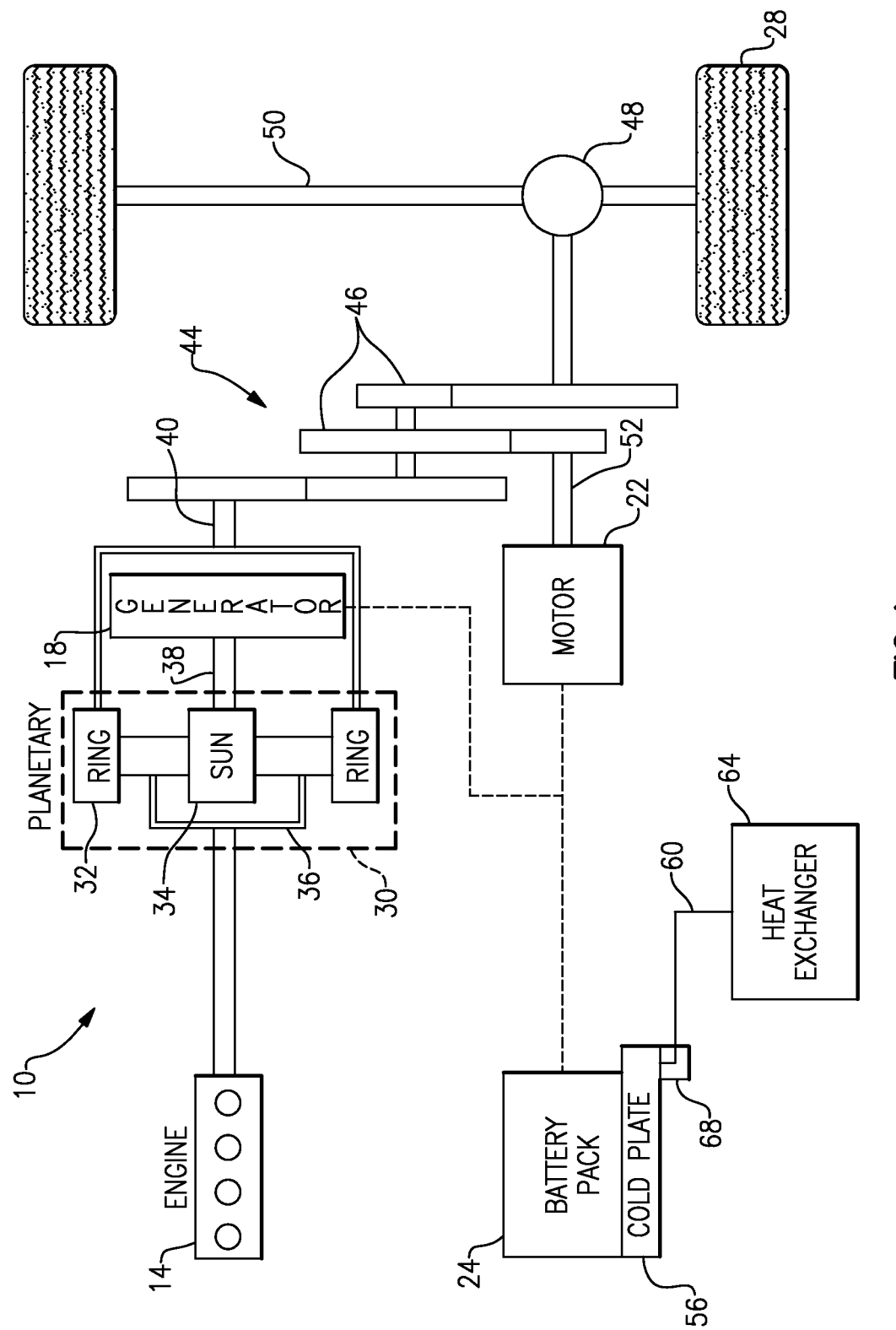
FIG. 1 illustrates a schematic view of a powertrain of an example electric vehicle.
Figure 2:
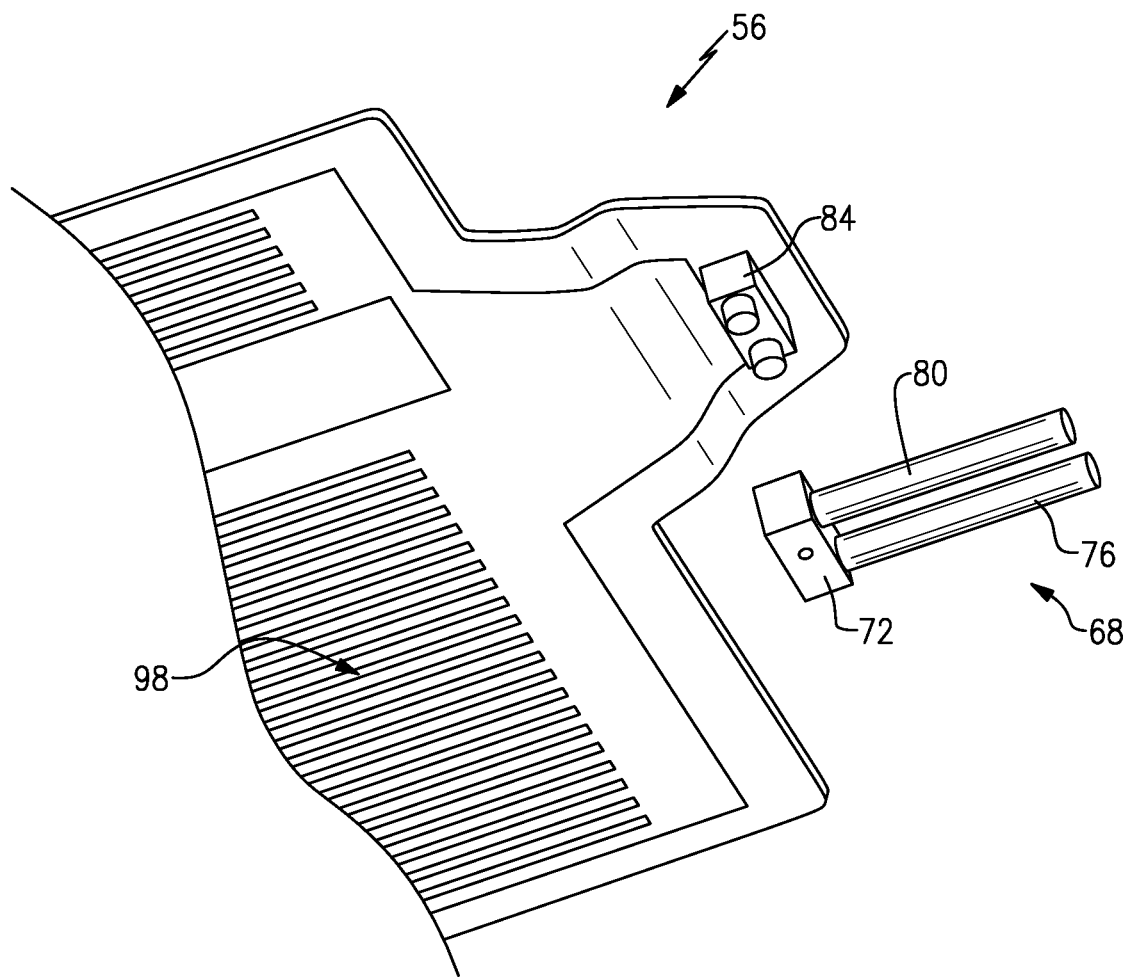
FIG. 2 illustrates a bottom view of a coupling and a cold plate in a decoupled position.
Figure 3:
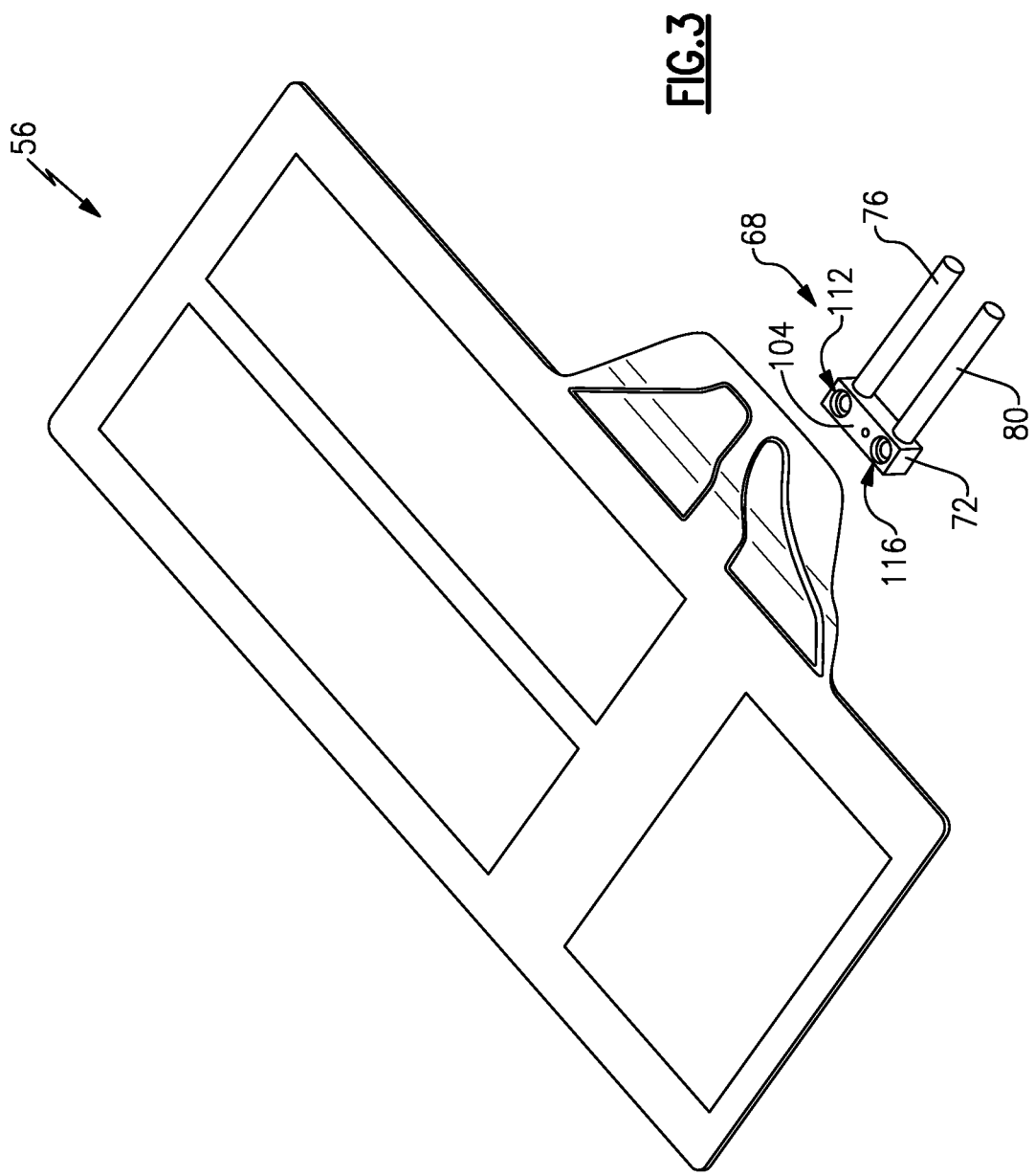
FIG. 3 illustrates a top view of the coupling and the cold plate of FIG. 2.
Figure 4:
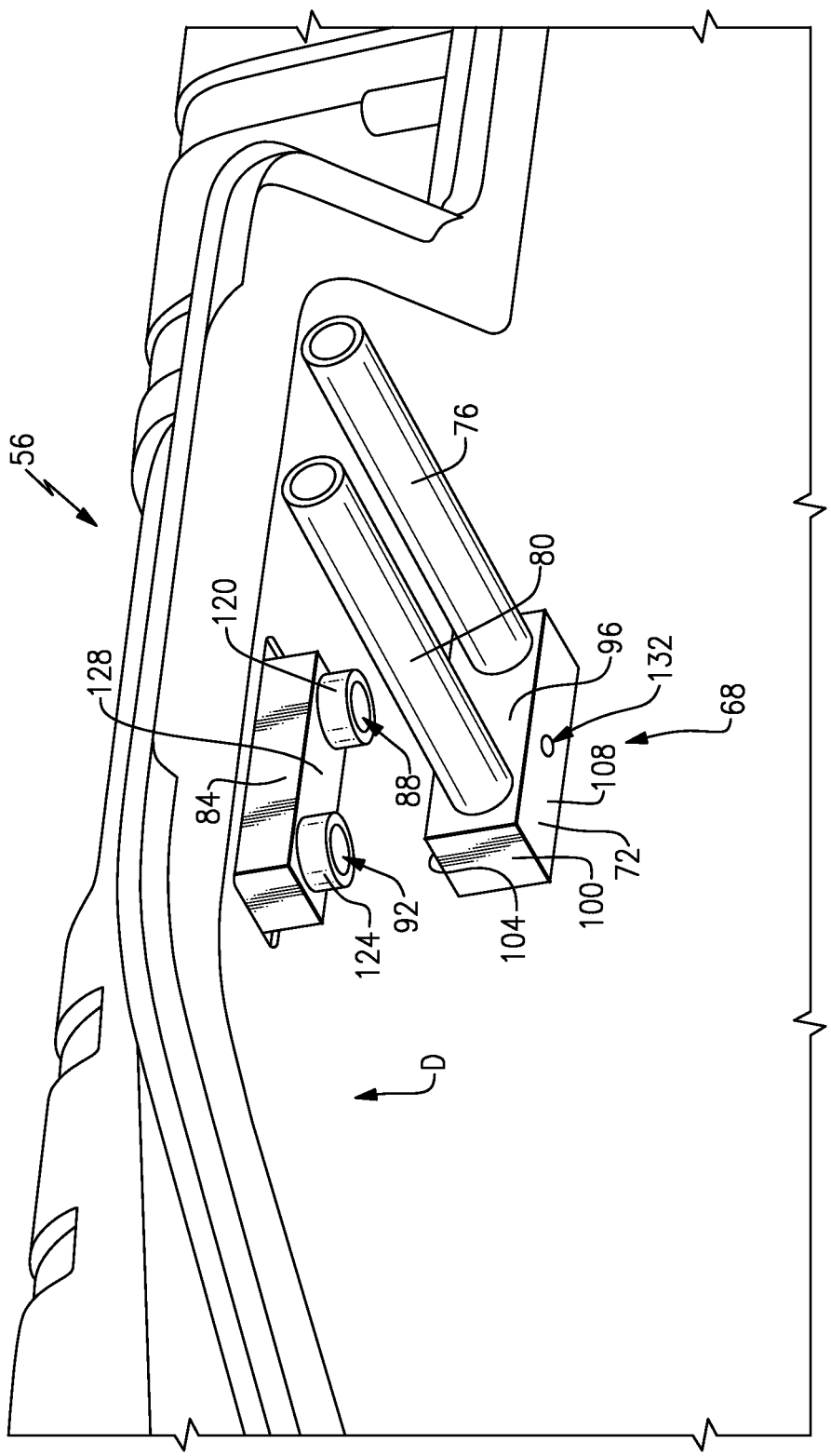
FIG. 4 illustrates a close-up view of the coupling and a cold plate extension in a decoupled position.
Figure 5:
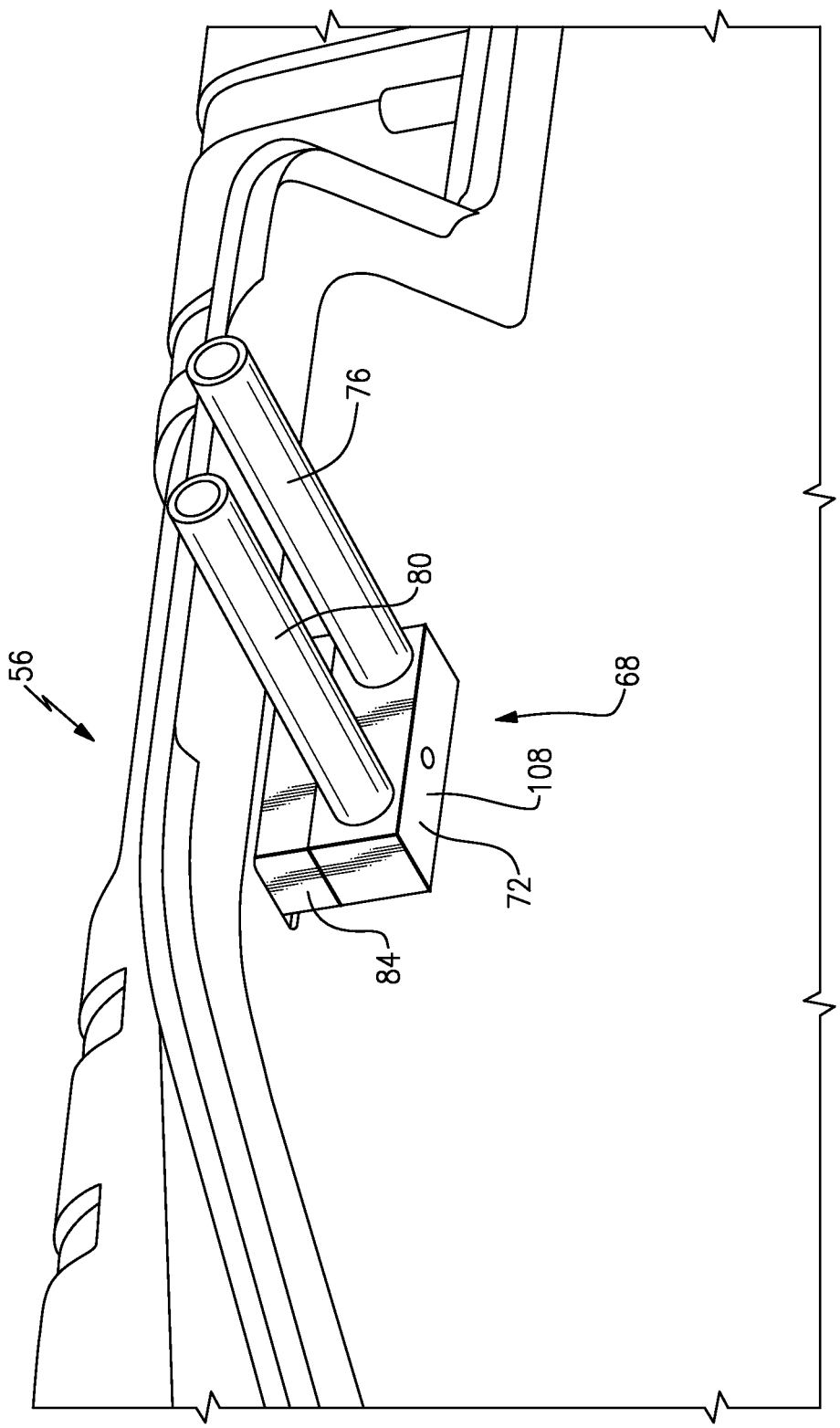
FIG. 5 illustrates the coupling and the cold plate extension of FIG. 4 in a coupled position.
Figure 6:
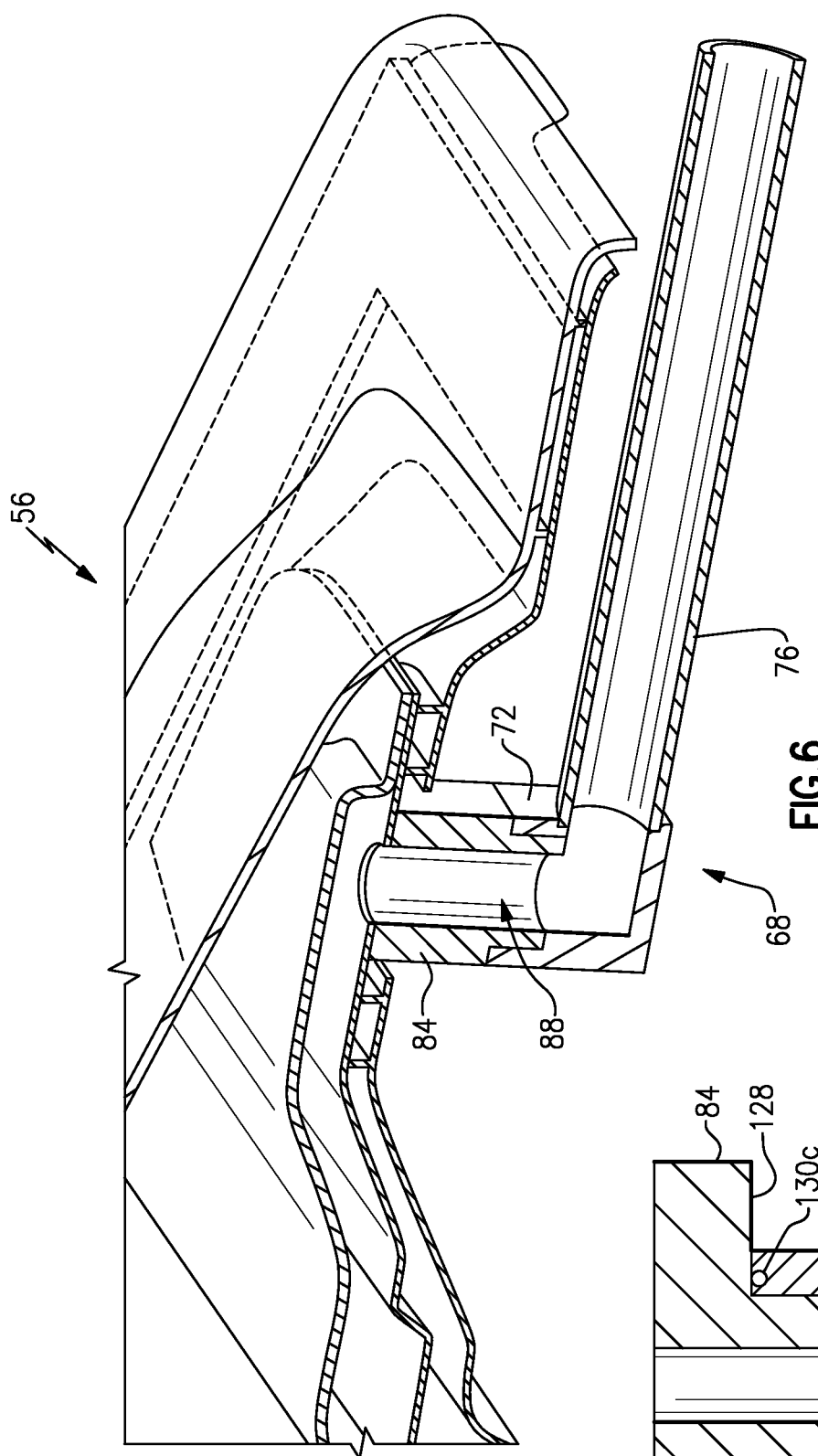
FIG. 6 illustrates a section view through a fluid inlet of the coupling and the cold plate.

FIG. 1 schematically illustrates a powertrain 10 for an electric vehicle. Although depicted as a hybrid electric vehicle (HEV), it should be understood that the concepts described herein are not limited to HEVs and could extend to other electrified vehicles, including, but not limited to, plug-in hybrid electric vehicles (PHEVs) and battery electric vehicles (BEVs).

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electric vehicle.

The engine 14, which is an internal combustion engine in this example, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an example type of electric vehicle battery assembly. The battery pack 24 may have the form of a high voltage battery that is capable of outputting electrical power to operate the motor 22 and the generator 18. Other types of energy storage devices and/or output devices can also be used with the electric vehicle having the powertrain 10.

The battery pack 24 generates thermal energy during operation of the powertrain 10. A cold plate 56 is incorporated into the powertrain 10 to remove the thermal energy and cool the battery pack 24. In this example, fluid circulates through the cold plate 56 and is communicated away from the cold plate to carry thermal energy away from the battery pack 24. In another example, the fluid communicates thermal energy to the cold plate 56 to warm the battery pack 24, such as in extremely cold environments.

Fluid moves from a heat exchanger 64 along the fluid path 60 to the cold plate 56. Fluid moves from the cold plate 56 along a fluid path 60 to the heat exchanger 64. The fluid path 60 can include an inlet path and an outlet path separate from the inlet path.

Fluid communicates to and from the cold plate 56 through a coupling 68. During operation, relatively cool fluid moves to the cold plate 56 though the coupling 68 and circulates through the cold plate 56. The fluid in the cold plate 56 is heated due to thermal energy from the battery pack 24. The heated fluid then communicates back through the coupling 68 to the heat exchanger 64. The heat exchanger 64 removes thermal energy from the heated fluid. The thermal energy from fluid may be expelled to the surrounding environment.

Although the example cold plate 56 and coupling 68 are shown utilized in connection with the battery pack 24, a person having skill in this art in the benefit of this disclosure could understand other areas of the powertrain 10, and other areas of vehicles, that would benefit from the teachings of this disclosure.

Referring now to FIGS. 2-6 with continuing reference to FIG. 1, the example coupling 68 includes an attachment member 72, a fluid inlet 76, and a fluid outlet 80. The fluid inlet 76 and the fluid outlet 80 extend away from the attachment member 72.

The attachment member 72 is selectively coupled to a cold plate extension 84 of the cold plate 56. The attachment member 72, in other examples, could attach directly to the cold plate 56 without any cold plate extension 84.

During operation, fluid from the fluid inlet 76 communicates through the attachment member 72, and fluid separately communicates though the attachment member 72 to the fluid outlet 80. The cold plate extension 84 is aluminum in this example, and can be welded or brazed to the other portions of the cold plate 56. That is, the cold plate extension 84 may extend from various areas of the cold plate 56 including a bottom surface, top surface, side surface, etc.

In this example, fluid is moved from the heat exchanger 64 to the fluid inlet 76 with an inlet hose (not shown), for example. The fluid from the fluid inlet 76 is redirected and turned within the attachment member 72. The fluid is turned about ninety degrees in this example. The fluid then flows into the portion of the fluid inlet conduit 88 defined by the cold plate extension 84.

The fluid moves from the cold plate extension 84 into the various paths and channels 98 within the cold plate 56. The fluid within the channels 98 absorbs heat from the battery pack 24. This heated fluid is then communicated back through the portion of the fluid outlet conduit 92 defined by the cold plate extension 84.

Heated fluid moves from the cold plate 56 through the cold plate extension 84 to the attachment member 72. The heated fluid is turned or redirected within the attachment member 72 before flowing into the fluid outlet 80. The fluid is turned about ninety degrees in this example. The fluid outlet 80 communicates the heated fluid to an outlet hose (not shown), for example, that carries the fluid back to the heat exchanger 64.

In this example, the inlet hose, the fluid inlet 76, the attachment member 72 and the cold plate extension 84 each provide portions of a fluid inlet conduit 88. Further, the outlet hose, the fluid outlet 80, the attachment member 72 and the cold plate extension 84 each provide portions of a fluid outlet conduit 92. The coupling 68 thus defines portions of both the fluid inlet path to the cold plate and the fluid outlet path from the cold plate 56.

In this example, the fluid inlet 76 and the fluid outlet 80 of the coupling 68 interface with a common surface 96 of the attachment member 72. In other examples, the fluid inlet 76 and the fluid outlet 80 interface with different surfaces.

The fluid inlet 76 and the fluid outlet 80 are aluminum in this example, as is the attachment member 72. Other materials such as moldable polymers or castable materials, could be used in other examples. The fluid inlet 76 and the fluid outlet 80 can be brazed to attach the fluid inlet 76 and the fluid outlet 80 to the common surface 96 of the attachment member 72.

The example attachment member 72 has a rectangular shape. Walls 100 of the attachment member 72 extend away from an interfacing surface 104 of the attachment member 72. The walls 100 terminate at a fastener surface 108. The interfacing surface 104 and the fastener surface 108 face in opposite directions. The example common surface 96 is provided by one of the walls 100. The fastener surface 108 and the common surface 96 could be the same surface in some examples or offset from each other at angles other than 90 degrees.

The interfacing surface 104 interfaces directly with the cold plate 56, and the cold plate extension 84 of the cold plate 56 in this example. The example interfacing surface 104 is aligned with, and in this example parallel to, the fastener surface 108.

The example interfacing surface 104 is perpendicular to the common surface 96 and the remaining walls of the attachment member 72. More specifically, in this example, the interfacing surface 104 is perpendicular to the common surface 96 and the other walls of the attachment member 72. In other examples, one or both of the fluid inlet 76 and fluid outlet 80 may be at some other angle, such as less than 90 degrees, offset from the interfacing surface 104, the fastener surface 108, or both.

Fluid is thus communicated to the attachment member 72 in a first direction and communicated from the attachment member 72 in a second direction that is not parallel to the first direction. The first direction is perpendicular to the second direction in this example.

The interfacing surface 104 defines an inlet opening 112 and an outlet opening 116. The inlet opening 112 is configured to receive an inlet extension 120 of the cold plate extension 84. The outlet opening 116 is configured to receive an outlet extension 124 of the cold plate extension 84. The inlet extension 120 is received within the inlet opening 112 and the outlet extension 124 is received within the outlet opening 116 when the coupling 68 is coupled to the cold plate extension 84.

Seals, such as o-ring seals, can be circumferentially disposed about the inlet extension 120 and the outlet extension 124. The seals inhibit leakage when fluid communicates between the coupling 68 and the cold plate extension 84. Alternatively, or in addition to the seals about the inlet extension 120 and the outlet extension 124, the interfacing surface 104 may seal against a corresponding mating surface 128 with a, for example, polymer seal.

Figure 7:
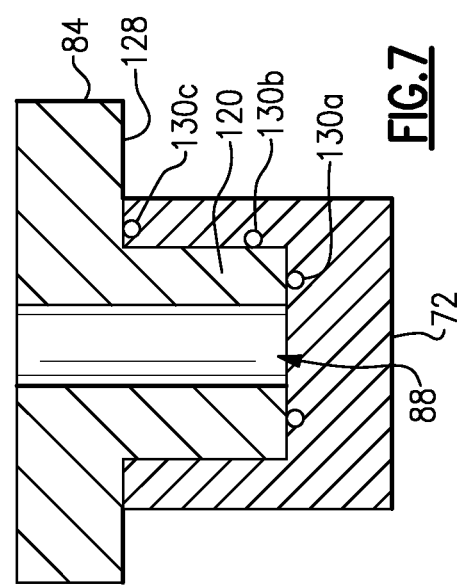
FIG. 7 illustrates a section view showing various example sealing locations between the coupling and the cold plate extension.

FIG. 7 shows three potential locations for sealing interfaces, 130a, 130b, and 130c. Each of these sealing interfaces 130a, 130b, and 130c, could be used alone or in combination with other sealing interfaces.

Referring again to FIGS. 2-6, the fastener surface 108 of the attachment member 72 includes an opening 132. When the coupling 68 is secured to the cold plate extension 84, a fastener, such as a mechanical fastener like a screw, is received within the opening 132 and secured into the cold plate extension 84 through the mating surface 128. The fastener may be located flush or recessed to the fastener surface 108.

Only a single fastener is required to secure the coupling 68 to the cold plate extension 84 in this example. In another example, more than one fastener can be used to secure the coupling 68. The attachment member 72 could also snap-fit to the cold plate extension 84 in some examples, or snap-fit in combination with one or more mechanical fasteners.

The example coupling 68 is secured to the cold plate extension 84 with a securing movement primarily in a single direction D. This, as can be appreciated, facilitates assembly of the coupling 68. In the prior art, relatively complex movements in multiple directions may be required to secure a coupling.

In this example, the cold plate extension 84 and coupling 68 are on the same side of the cold plate 56. In another example, the cold plate extension 84 is positioned on opposing sides of the cold plate 56 from the coupling 68. The cold plate 56, in such an example, is sandwiched between the coupling 68 and the cold plate extension 84.

Features of the disclosed examples include positioning interfacing components external to the battery pack, which can advantageously position areas prone to leakage external to the battery pack. The disclosed examples may provide a coupling assembly that is relatively easy to service and install, all while meeting vehicle durability and coolant fill pressure requirements. The coupling is relatively low-profile and can require less than half the packaging space of prior art designs.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method of communicating fluid to and from a cold plate of an electric vehicle, comprising:

securing an attachment member of a coupling to a cold plate extension that is affixed to the cold plate of a battery pack within the electric vehicle;

communicating fluid into the cold plate extension from a fluid outlet extending from the attachment member;

communicating fluid from the cold plate extension to a fluid inlet extending from the attachment member; and redirecting the fluid within the attachment member.

2. The method of claim 1, further comprising securing by fastening the coupling to the cold plate extension with a mechanical fastener, wherein the fluid enters the attachment member from the cold plate through an opening in a common surface of the attachment member and is communicated from the attachment member back to the heat exchanger through another opening in the common surface, wherein the fastener extends through a fastener surface of the attachment member that is separate and distinct from the common surface.

3. The method of claim 1, wherein the fluid inlet and the fluid outlet interface with a common surface of the attachment member, wherein the common surface is aligned along a first plane, and the attachment member interfaces with the extension of the cold plate at an interfacing surface that is aligned along a second plane containing a line that is transverse to the first plane.

4. The method of claim 1, wherein the attachment member comprises an interfacing surface, and a plurality of walls extending away from the interfacing surface, the interfacing surface interfacing with the cold plate, the fluid inlet extending from at least one of the plurality of walls, the fluid outlet extending from at least one of the plurality of walls, wherein the plurality of walls extend from the interfacing surface to a fastener surface, the fastener surface defining an opening to receive a fastener that secures the attachment member to the extension.

* * * * *

UNITED STATES PATENT AND TRADEMARK OFFICE
CERTIFICATE OF CORRECTION

PATENT NO. : 11,028,947 B2  
APPLICATION NO. : 14/087268  
DATED : June 8, 2021  
INVENTOR(S) : Giriraj Srinivasan, Neil Robert Burrows and James McManaman Page 1 of 1

It is certified that error appears in the above-identified patent and that said Letters Patent is hereby corrected as shown below:

In the Claims

In Claim 2, Column 7, Line 14; replace "the heat exchanger" with --the cold plate--

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*